(12) United States Patent
Wu et al.

(10) Patent No.: US 8,130,339 B2
(45) Date of Patent: Mar. 6, 2012

(54) BACKLIGHT MODULE

(75) Inventors: Chen-Yi Wu, Tainan (TW); Chien-Chao Jaw, Tainan (TW); Hsueh-Chien Tseng, Tainan (TW)

(73) Assignee: Chimei Innolux Corporation (TW)

( * ) Notice: Subject to any disclaimer, the term of this patent is extended or adjusted under 35 U.S.C. 154(b) by 431 days.

(21) Appl. No.: 11/641,489

(22) Filed: Dec. 19, 2006

(65) Prior Publication Data
US 2007/0139958 A1 Jun. 21, 2007

(30) Foreign Application Priority Data
Dec. 21, 2005 (TW) ................. 94145620 A

(51) Int. Cl.
*G02F 1/1335* (2006.01)
(52) U.S. Cl. ............................ 349/65; 349/67; 362/600
(58) Field of Classification Search .................... 349/58, 349/61–71; 362/600, 609, 623
See application file for complete search history.

(56) References Cited

U.S. PATENT DOCUMENTS

| | | | | |
|---|---|---|---|---|
| 5,280,372 A * | 1/1994 | Horiuchi | ........................... | 349/65 |
| 6,435,685 B2 * | 8/2002 | Matsushita | .................... | 362/608 |
| 6,721,021 B2 * | 4/2004 | Sakamoto et al. | ............... | 349/58 |
| 6,811,276 B2 * | 11/2004 | Moon | ........................... | 362/600 |
| 7,507,013 B2 * | 3/2009 | Shimizu et al. | ................ | 362/633 |
| 2002/0167626 A1 * | 11/2002 | Matsuda et al. | ................. | 349/65 |
| 2003/0179580 A1 * | 9/2003 | Ito et al. | ........................ | 362/306 |
| 2004/0022515 A1 * | 2/2004 | Sugiura et al. | ................ | 385/146 |
| 2004/0228110 A1 | 11/2004 | Hsieh | | |
| 2005/0270671 A1 | 12/2005 | Nousou | | |
| 2006/0187376 A1 * | 8/2006 | Wang et al. | ..................... | 349/62 |

FOREIGN PATENT DOCUMENTS
JP 6174934 6/1994
TW 223702 11/2004
* cited by examiner

*Primary Examiner* — Thanh-Nhan Nguyen
(74) *Attorney, Agent, or Firm* — Trop Pruner & Hu, P.C.

(57) ABSTRACT

A backlight module includes a back housing, a top housing, a lamp, a light-guide plate, and a reflecting sheet. The back housing includes a bottom plate. The back housing and top housing form an accommodating space; the lamp is situated in the accommodating space. The light-guide plate is disposed on the bottom plate and has a lateral light-inputting surface and a bottom surface. Light emitted from the lamp enters the light-guide plate through the lateral light-inputting surface. The reflecting sheet is disposed between the light-guide plate and the bottom plate. The reflecting sheet includes a curved portion to enable the light-guide plate and the reflecting sheet to be combined conformingly.

9 Claims, 7 Drawing Sheets

BACKLIGHT MODULE

CROSS REFERENCE TO RELATED APPLICATION

This application claims priority under 35 U.S.C. §119 of Taiwan Application Serial No. 094145620, filed Dec. 21, 2005.

TECHNICAL FIELD

The invention relates generally to a backlight module and more particularly to a backlight module having a laterally disposed light source.

BACKGROUND

Flat panel displays are widely available to consumers. For example, liquid crystal displays (LCDs) are standard for computer use and are available for home theater televisions. The LCD panel has a liquid crystal layer sandwiched between two transparent substrates and is illuminated by a backlight module. FIG. 1A is a cross-sectional view of a conventional backlight module. The conventional backlight module 10 includes a reflecting sheet 2, a light-guide plate 1, a lamp 6, a lateral housing 3, and back 4 and top 5 housings. The reflecting sheet 2 is attached to a bottom surface of a light-guide plate 1 and a lamp 6 is disposed near a lateral surface of the light-guide plate 1. The lateral housing 3 tightly clamps the reflecting sheet 2 and the light-guide plate 1 together. This assembly is placed on the back housing 4; the top housing 5 is connected to the back housing 4. To embed the reflecting sheet 2 and the light-guide plate 1 into the lateral housing 3, the lateral housing 3 is temporarily deformed. This method of assembly wastes time and labor costs, and it is inefficient.

If, however, the lateral housing is not used, the reflecting sheet and the light-guide plate may not be completely sealed together. For example, the light-guide plate may form a positive buckle (FIG. 1B at 20) or a negative buckle (FIG. 1C at 70) due to one or more of residual stress, temperature change, and humidity change. With the positive buckle, the two edges of the light-guide plate 20 are higher than the middle portion, and with the negative buckle, the middle portion of the light-guide plate 70 is higher than its two edges. Because negatively-buckled light-guide plate 70 arches so that the middle portion contacts a display panel 60, the display quality may be influenced, and the light-guide plate 70 and a reflecting sheet 80 (which is disposed on a back housing 90) cannot be sealed together. To prevent the light-guide plate from contacting the panel, the buckle has to be limited to the positive buckle.

Referring back to the positive buckle shown in FIG. 1B, and taking a 17" panel as an example, the distance d2 from the highest point to the lowest point of the light-guide plate 20 cannot be greater than 0.5 millimeters (mm). In this example, the back housing 40 may form a positive buckle or a negative buckle (the middle portion of the back housing 40 is higher than the two edges of the back housing 40). The conventional reflecting sheet 30 is a thin sheet that is attached to a back housing 40; thus, if the back housing 90 buckles, the reflecting sheet 30 buckles as well. Moreover, if the disposed reflecting sheet 30 has the negative buckle the distance d1 from the highest point to the lowest point of the reflecting sheet 30 should be smaller than or equal to 0.5 mm. Nevertheless, the maximum distance from the highest point of the positively buckled light-guide plate 20 to the lowest point of the negatively buckled reflecting sheet 30 may reach 1 mm. This distance is sufficient to enable light L outputted by the lamp 50 to directly irradiate on the reflecting sheet 30 and to be reflected to form a bright zone on a display panel surface, thereby influencing the external appearance of the product.

Thus, there is a need for a backlight module that reduces the gap between the reflecting sheet and the light-guide plate without using a clamping lateral housing.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a backlight module including a protruding mechanism is provided. The protruding mechanism can be disposed on a bottom plate of a back housing of a liquid crystal display. The protruding mechanism causes a curved portion to be formed on a reflecting sheet that is placed on the back housing. Thus, the negative buckle of the reflecting sheet is reduced so that the reflecting sheet and the light-guide plate may be sealed together. Because the reflecting sheet and the light-guide plate are combined conformingly, light, from a lamp, does not directly project onto the reflecting sheet or reflect in a direction toward a display panel to form a bright zone.

Figure 1A:
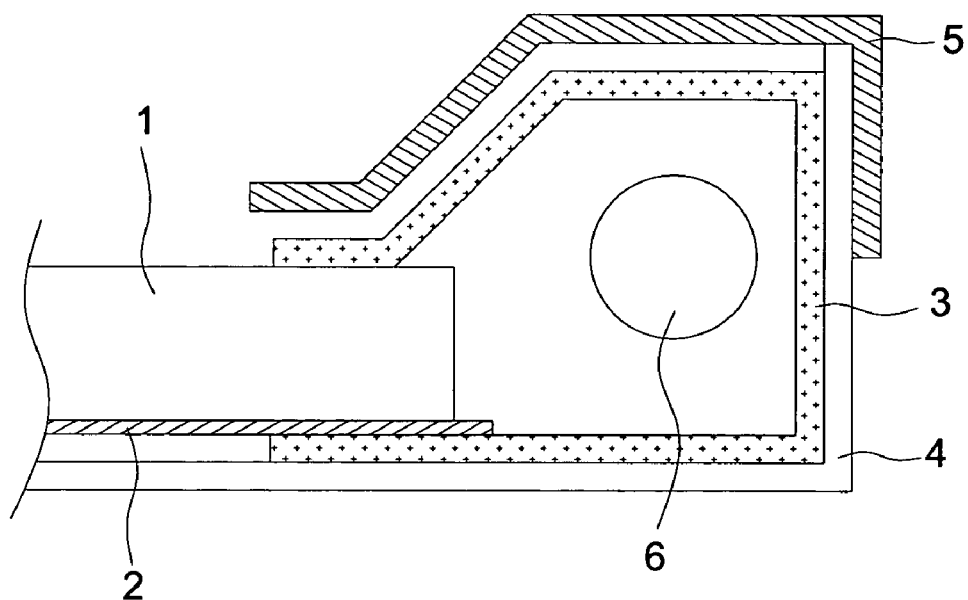
FIG. 1A is a cross-sectional view of a conventional backlight module.
Figure 1B:
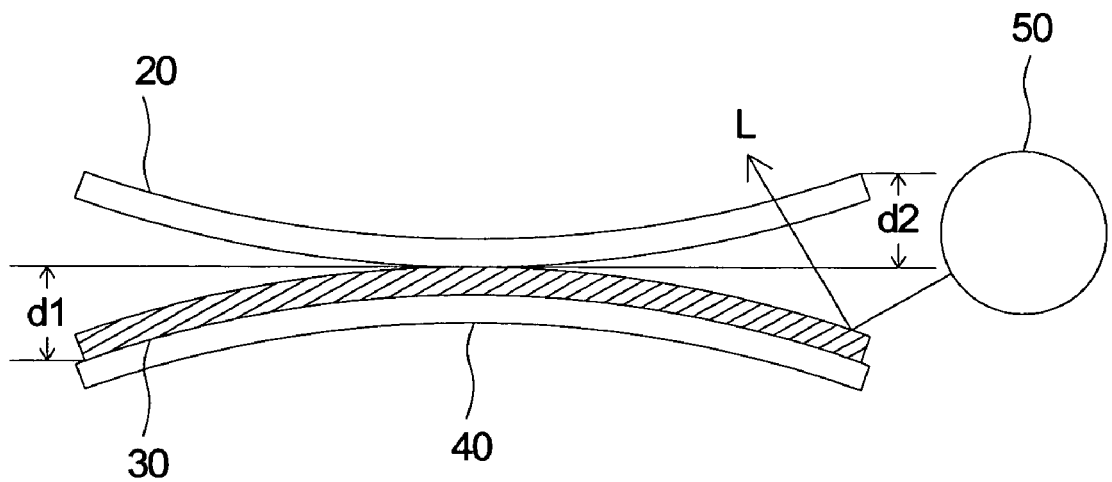
FIG. 1B is a partially enlarged view showing a contact interface between a conventional light-guide plate and a conventional reflecting sheet.
Figure 1C:
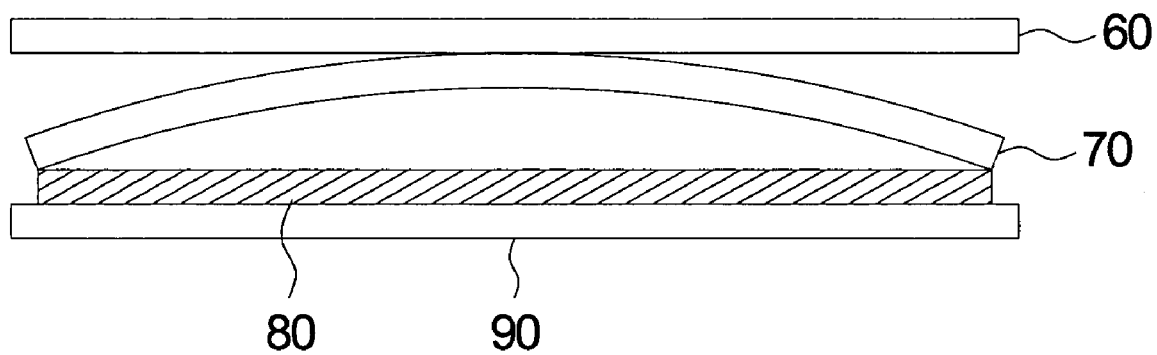
FIG. 1C is a schematic illustration showing a negative buckle formed in the conventional light-guide plate.
Figure 2:
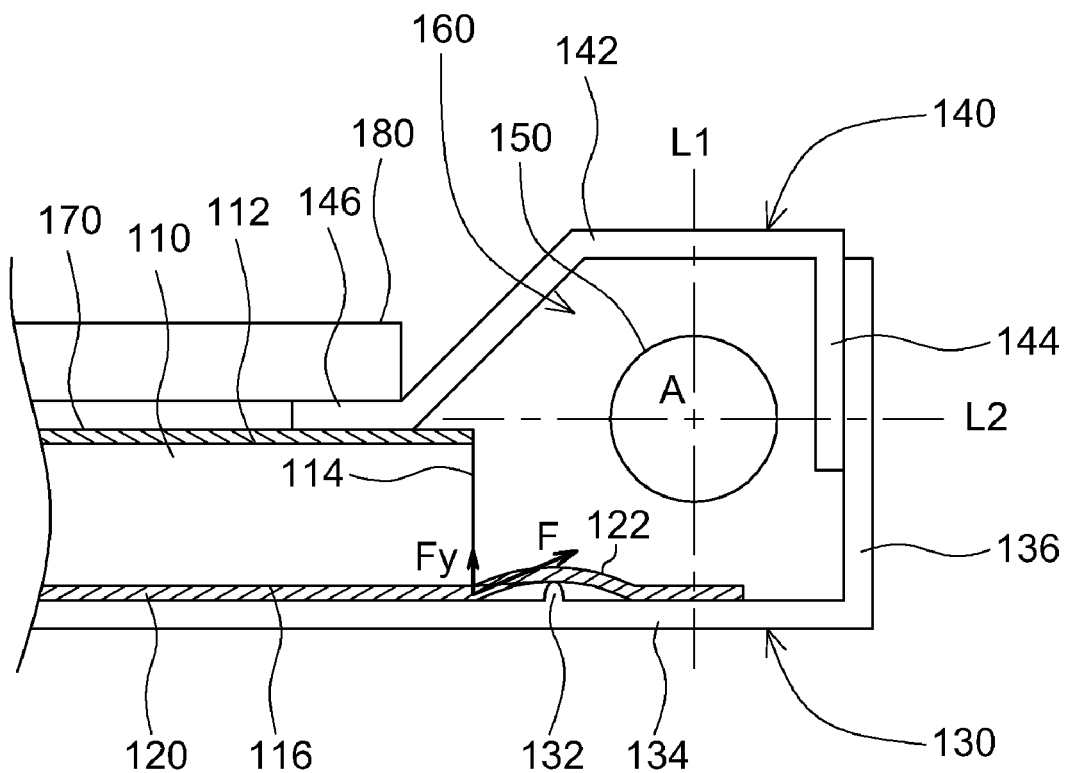
FIG. 2 is a partial cross-sectional view of a display device in accordance with an embodiment of the invention.

FIG. 2 is a cross-sectional view showing an exemplary display device 100 according to some embodiments of the invention. The display device 100 includes a display panel 180 and a backlight module. The backlight module includes a back housing 130, a top housing 140, a reflecting sheet 120, a light-guide plate 110 and a light source such as a lamp 150. The back housing 130 and the top housing 140 may be made of aluminum or iron to have sufficient rigidity and to reflect light. Alternatively, the top housing 140 may be made of a plastic material, but a reflecting sheet can be added to the inner side of the housing 140 to reflect light. The back housing 130 includes a bottom plate 134 and a lateral plate 136. The top housing 140 includes a top plate 142 and another lateral plate 144. The lateral plates 136 and 144 can be connected. For example, the lateral plate 136 and the lateral plate 144 may be buckled, engaged, or screwed together. As used herein, terms such as "top" and "bottom" are used merely to indicate a certain orientation. Other orientations are possible such that what was on "top" may, in fact, have a different orientation.

The light-guide plate 110 may be disposed on the bottom plate 134. As used herein, the term "disposed on" refers to either directly on or indirectly on. For instance, the light-guide plate may be disposed on another structure (or structures) that are on the bottom plate. The light-guide plate 110 has a lateral light-inputting surface 114 and a bottom surface 116. Light emitted from the lamp 150 enters the light-guide plate 110 through the lateral light-inputting surface 114 and is reflected from the bottom surface 116 in a diffusion manner. The lamp 150 may be, for example, a Cold Cathode Fluorescent Lamp (CCFL), although embodiments are not so limited.

The light-guide plate 110 can also be disposed on the reflecting sheet 120. The reflecting sheet 120 includes a curved portion 122 for enabling the light-guide plate 110 and the reflecting sheet 120 to be combined conformingly. As shown in FIG. 2, the curved portion 122 applies a tension force F on the horizontal portion of the reflection sheet 120 near the lateral light-inputting surface 114 and the vertical component Fy of the tension force F helps to pull the horizontal portion of the reflecting sheet 120 upward so as to counteract the buckling of the light-guide plate 110 that causes an edge of the light-guide plate 120 to curve away from the reflecting sheet 120. Because the light-guide plate 110 and reflecting sheet 120 are combined conformingly, the gap between the reflecting sheet 120 and the edge of the light-guide plate 110 is eliminated and the edge of the light-guide plate 110 and the reflecting sheet 120 may be sealed together. In other words, the curved portion 122 enables the reflecting sheet 120 and the light-guide plate 110 to be sealed together. As a result, light is not directly incident to the reflecting sheet 120 or reflected by the reflecting sheet 120 to form a bright zone, which seriously influences the external appearance of the product.

In addition to the lateral light-inputting surface 114 and the bottom surface 116, the light-guide plate 110 may also have a top light-outputting surface 112. The top light-outputting surface 112 of the light-guide plate 110 may have one or more optical film sheets 170 disposed thereon. In some embodiments, the optical film sheet 170 may be a diffuser or a prism sheet. In other embodiments, more than one optical film sheet may be disposed on the surface of the light-guide plate. For example, a diffuser sheet may be attached to a prism sheet, or a prism sheet may be sandwiched between two diffuser sheets. Other variations of optical film sheets also fall within the scope of the invention.

The top plate 142 of the top housing 140 has an end 146. The end 146 is pendent such that the top housing 140 and the bottom plate 134 clamp the light-guide plate 110. For instance, the end 146 of the top plate 142 may contact the optical film sheet 170 and press the optical film sheet 170 against the top light-outputting surface 112 of the light-guide plate 110 whereas the bottom plate 134 contacts the reflecting sheet 120 to press against the bottom surface 116. The top housing 140 and bottom plate 134 also form an accommodating space 160. The lamp 150 is fixed in the accommodating space 160. The display panel 180 is disposed on the end 146 of the top plate 142 and is separated from the light-guide plate 110. The display panel 180 can be an LCD panel, although embodiments are not so limited.

Figure 6:
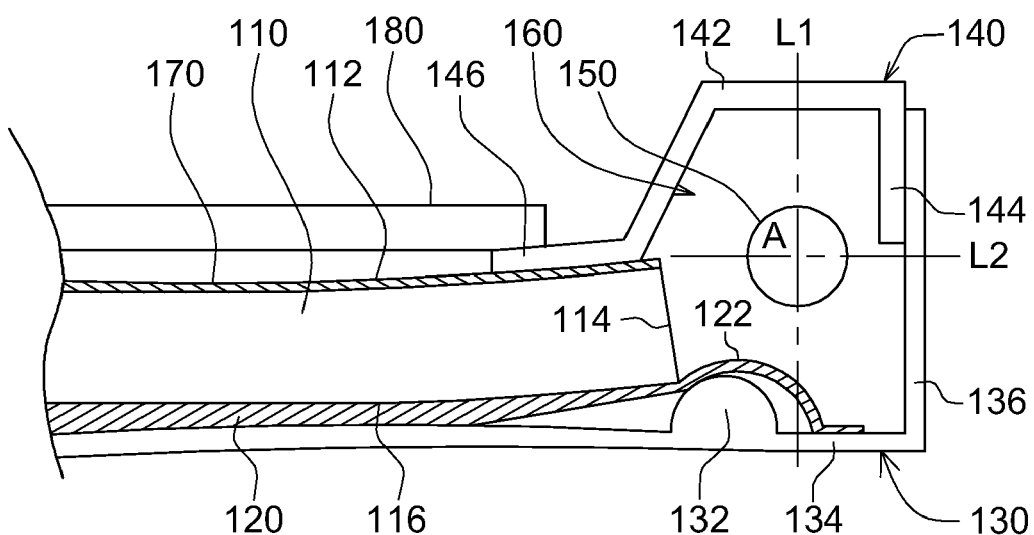
FIG. 6 is a partial cross-sectional view of a display device in accordance with a further embodiment of the invention.

In some embodiments, the curved portion 122 of the reflecting sheet 120 may be below the bottom surface 116 of the light-guide plate 110. As shown in FIG. 6, a part of the curved portion 122 is under the light-guide plate 110. In some embodiments, however, the curved portion 122 may be located near the edge of the light-guide plate 110. For example, as is shown in FIG. 2, the curved portion 122 may be located in the accommodating space 160, disposed between the lamp 150 and the light-guide plate 110. In some embodiments, the horizontal position of the curved portion 122 is between the light-guide plate 110 and an axial line L1. Furthermore, the height of the curved portion 122 ranges between the back housing 130 and an axial line L2. The axial line L1 passes through a center axis A of the lamp 150 and is perpendicular to the back housing 130, and the axial line L2 passes through the center axis A and is perpendicular to the light-guide plate 110. In the illustrated embodiment, the curved portion 122 is horizontally disposed between the light-guide plate 110 and the axial line L1, and vertically disposed between the back housing 130 and the axial line L2.

To form the curved portion 122 of the reflecting sheet 120, at least one protruding mechanism 132 can be disposed on the bottom plate 134 of the back housing 130. For instance, reflecting sheet 120 may be disposed on the bottom plate 134 to cover the protruding mechanism 132. Thus, the protruding mechanism 132 forms the curved portion 122 on the reflecting sheet 120. In other words, the protruding mechanism 132 may hold against the reflecting sheet 120 to form the curved portion 122, lifting a portion of the reflecting sheet 120 close to the light-guide plate 110. Thus, the light-guide plate 110 and the reflecting sheet 120 can be combined conformingly.

Figure 3:
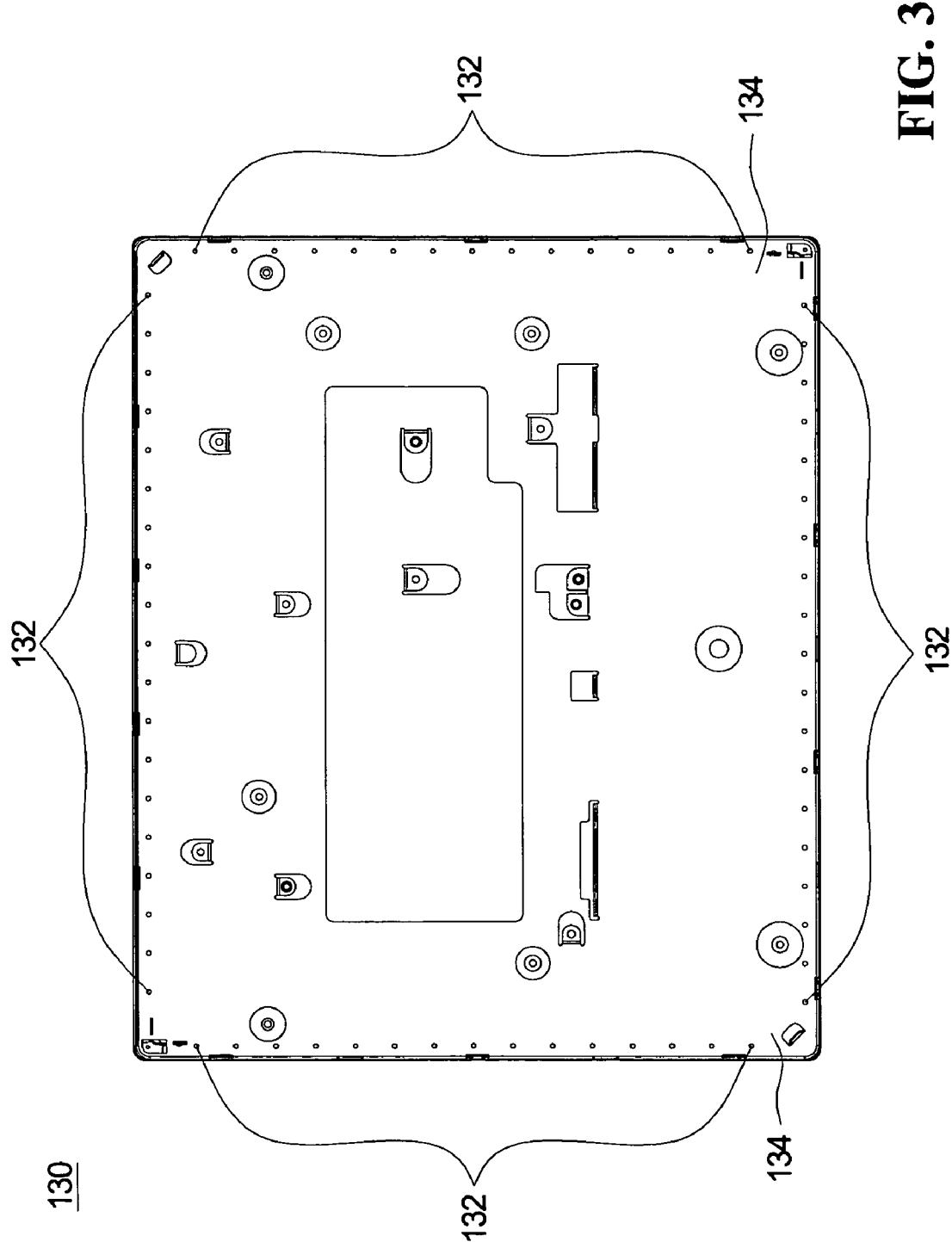
FIG. 3 is a top view of a back housing in accordance with an embodiment.
Figure 4:
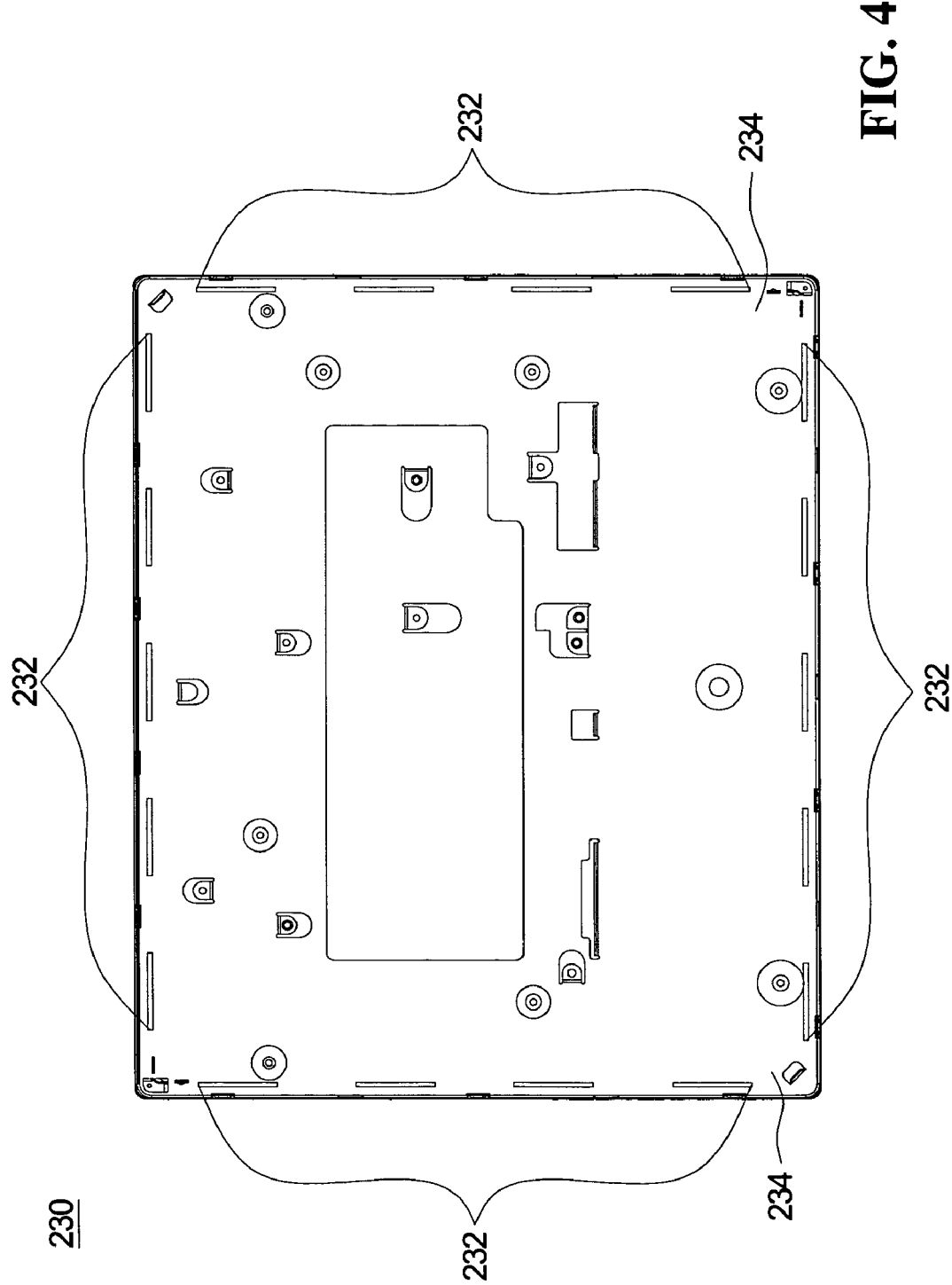
FIG. 4 is a top view of another back housing in accordance with an embodiment.

FIGS. 3 and 4 illustrate top views of some embodiments of back housings. The back housing 130 shown in FIG. 3 has multiple protruding mechanisms 132 each having a dot-like shape. In some embodiments, the dot-like protruding mechanisms 132 are disposed on the bottom plate 134 of the back housing 130 with a fixed distance between adjacent dots.

The back housing 230 shown in FIG. 4 also has protruding mechanisms, each protruding mechanism 232 having a bar-like shape. As with the dot-like protruding mechanisms, adjacent bar-like protruding mechanisms 232 can be disposed on the bottom plate 234 with a fixed distance therebetween in some embodiments.

The protruding mechanisms 132 and 232 and the back housing 130 and 230 respectively may be integrally formed into one piece. For example, protruding features may be formed on a mold and a material is poured into the mold to form the protruding mechanisms 132 or 232. Alternatively, the protruding mechanisms 132 or 232 may be formed on a back housing by way of punching, or they may be disposed on a back housing by way of adhering or bonding. The protruding mechanism 132 and the back housing 130 shown in FIG. 2 are integrally formed into one piece.

Figure 5:
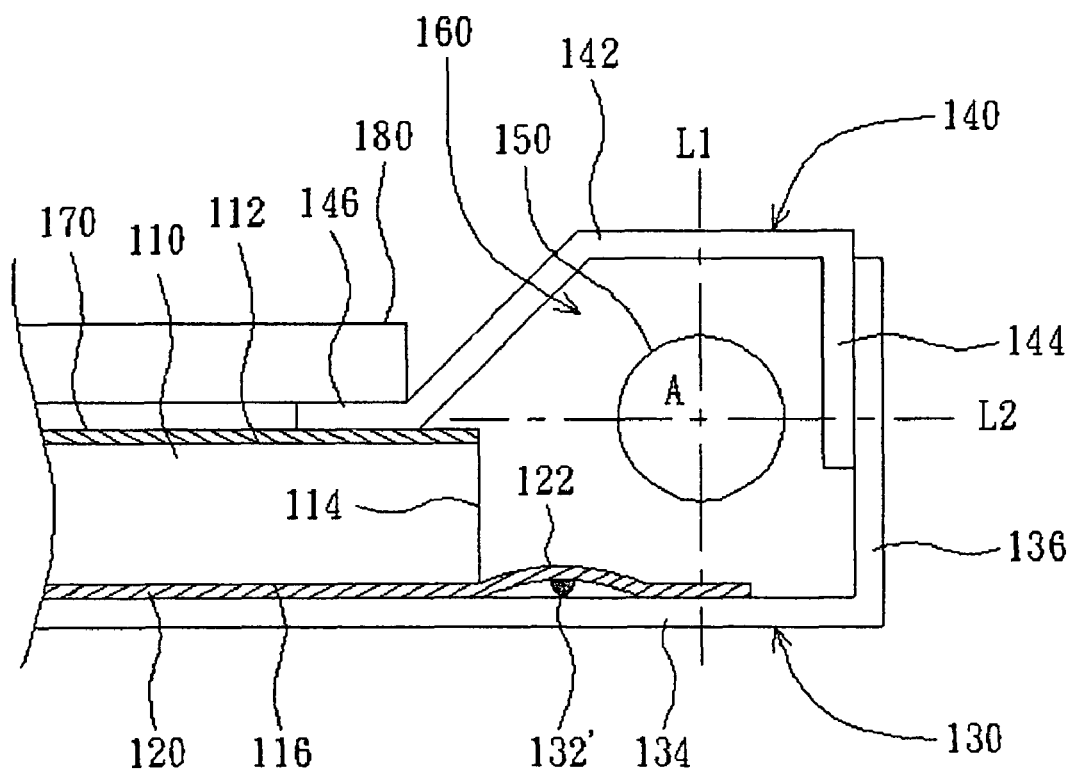
FIG. 5 is a partial cross-sectional view of a display device in accordance with another embodiment of the invention.

In some embodiments, dot-like, bar-like, or line-like protruding mechanisms may be formed on the reflecting sheet 120 (such as protruding mechanism 132' in FIG. 5). For example, a protruding mechanism may be adhered on a backside of the reflecting sheet 120 so that a curved portion may be formed when the reflecting sheet 120 is attached to the back housing 130. Alternatively, the edge of the reflecting sheet 120 may be bent to form an angle to make the reflecting sheet 120 buckle upward. Both protruding mechanisms and bent edges allow the reflecting sheet 120 and the light-guide plate 110 to be sealed together.

To manufacture some embodiments of a display device, such as display device 100 (shown in FIG. 2), a display panel 180 and a back housing 130 having a bottom plate 134 are prepared. The bottom plate 134 is covered by the reflecting sheet 120 and a curved portion 122 is formed on the reflecting sheet 120. A light-guide plate 110 is disposed on the reflecting sheet 120 so that the curved portion 122 is located near the edge of the light-guide plate 110 (in some embodiments). Notably, the light-guide plate 110 and the reflecting sheet 120 are combined conformingly. To form the curved portion 122 in this example, at least one protruding mechanism 132 is present on the back housing 134, although embodiments are not so limited. The protruding mechanism 132 contacts the reflecting sheet 120 to form the curved portion 122. Alternatively, in some embodiments, at least one protruding mechanism can be formed on the backside of the reflecting sheet 120 to form the curved portion 122. The other structural features previously described are not repeated here.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A display device, comprising:
   a display panel; and
   a backlight module comprising:
   a back housing having a bottom plate;
   a top housing, a portion of the top housing to support the display panel and another portion of the top housing connected to the back housing to form an accommodating space;
   a lamp situated in the accommodating space;
   a light-guide plate disposed on the bottom plate, the light-guide plate having a lateral light-inputting surface and a bottom surface, wherein light emitted from the lamp enters the light-guide plate through the lateral light-inputting surface;
   a reflecting sheet disposed between the light-guide plate and the bottom plate and in contact with the bottom surface of the light-guide plate, the reflecting sheet having a curved portion to enable the light-guide plate and the reflecting sheet to be combined conformingly, wherein the light emitted from the lamp and entering the light-guide plate reaches the reflecting sheet and is then directly reflected by the reflecting sheet, and the curved portion is configured to counteract buckling of the light-guide plate that causes an edge of the light-guide plate to curve away from the reflecting sheet, and wherein the curved portion protrudes towards the light-guide plate; and
   at least one protruding mechanism to form the curved portion of the reflecting sheet.

2. The display device of claim 1, wherein the light-guide plate includes an edge, the edge constructed from the lateral light-inputting surface and the bottom surface, the curved portion of the reflecting sheet arranged near the edge of the light-guide plate.

3. The display device of claim 2, wherein the at least one protruding mechanism is disposed on the bottom plate.

4. The display device of claim 3, further comprising a plurality of protruding mechanisms to form respective curved portions in the reflecting sheet, the plurality of protruding mechanisms disposed on the bottom plate, wherein adjacent protruding mechanisms are spaced apart.

5. The display device of claim 4, wherein each of the protruding mechanisms has one of a dot-like shape or a bar-like shape.

6. The display device of claim 5, wherein the protruding mechanisms and the back housing are integrally formed into one piece.

7. The display device of claim 2, further comprising at least one protruding mechanism disposed on the reflecting sheet, said protruding mechanism to form the curved portion.

8. The display device of claim 7, wherein the at least one protruding mechanism is adhered on the reflecting sheet.

9. The display device of claim 1, wherein at least a part of the curved portion is under the light-guide plate.

* * * * *